Aug. 17, 1954  C. B. NEEL, JR., ET AL  2,686,640
THERMAL-ELECTRIC MEANS OF AIRFOIL ICE PREVENTION
Filed April 13, 1951

Inventors
CARR BAKER NEEL, JR.
NORMAN R. BERGRUN

By F.J.Schmitt
Walter S. Pawl.
Attorneys

Patented Aug. 17, 1954

2,686,640

UNITED STATES PATENT OFFICE 2,686,640

THERMAL-ELECTRIC MEANS OF AIRFOIL ICE PREVENTION

Carr B. Neel, Jr., and Norman R. Bergrun, Palo Alto, Calif.

Application April 13, 1951, Serial No. 220,960

2 Claims. (Cl. 244—134)

(Granted under Title 35, U. S. Code (1952), sec. 266)

This invention relates generally to aircraft de-icers and specifically to a de-icer having intermittent action and balanced thermal distribution.

De-icers commonly in use are known to be inefficient for having excessive loads on the aircraft electrical systems and for having excessive heat losses in certain areas from which ice is to be removed while other areas do not effectively remove ice or prevent its formation.

An object of the present invention is to provide a de-icer which operates intermittently in sections of the area of ice removal, and which utilizes the output of the aircraft's generator without overload.

A still further object of the invention is to provide a de-icer in which the heat radiating areas are substantially continuous over the surface to be de-iced and in which the shape of the wing is not aerodynamically changed.

The exact nature of this invention as well as other objects and advantages thereof will be readily apparent from consideration of the following specification relating to the annexed drawing in which.

Figure 1:
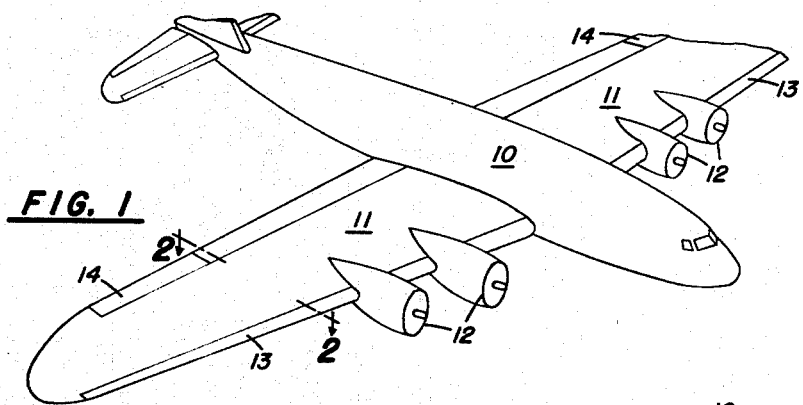
Fig. 1 is an isometric view of a portion of an airplane showing the relative position of the invention.
Figure 2:
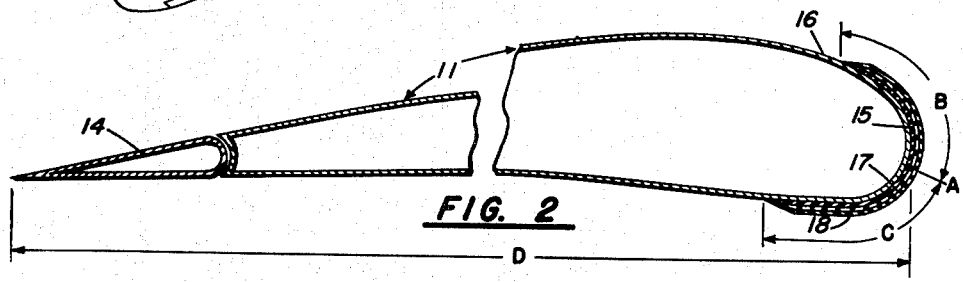
Fig. 2 is a view in section of the wing taken on line 2—2 of Fig. 1.
Figure 3:
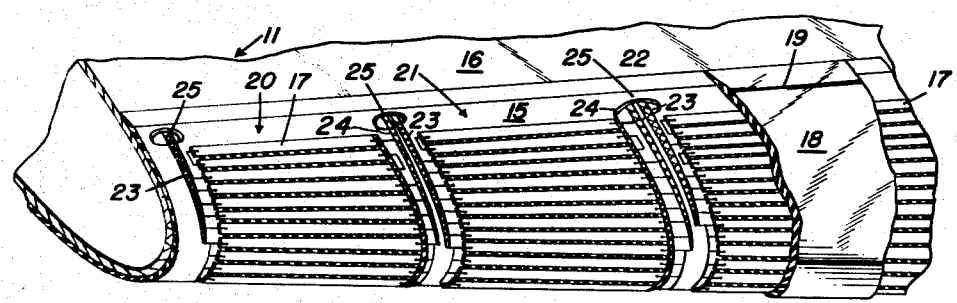
Fig. 3 is a view partly in section showing the positioning of the heating elements relative to the leading edge of the wing.

Referring now to the drawing in which like numerals indicate like parts throughout the several views, in Fig. 1, an airplane 10 is shown having wings 11, motors 12, wing leading edge 13, and ailerons 14. In Figs. 2 and 3, wing 11 is shown in profile section with an insulating layer 15 bonded to the wing surface 16 by cement or other conventional means. Resistance elements in this particular embodiment are shown as strips 17 composed of a metal having resistance to the passage of electrical energy and are shown as secured substantially parallel by cement or other means to the insulating layer 15. Strips 17 are laid flat and approximately ⅟₃₂ of an inch apart.

Figure 4:
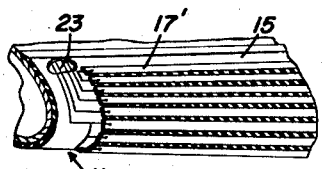
Fig. 4 is a view partly in section of another embodiment of the invention.

In the embodiment shown in Fig. 4, the strips 17' are tapered slightly from one end to the other and fixed to the insulating layer 15 with their widest ends toward the wing root. This permits the strips to maintain the distance apart from each other over the span of the wing and over the leading edge of the wing when the wing is tapered or diminishes in thickness from the root to the tip. It is to be understood, of course, that the taper of strips 17' is to be substantially the same as the taper of the wing span and thickness.

Outer covering 18, preferably an electrical insulating varnish, fills the interstices between the strips 17, 17' and forms a protective coating over the strips to minimize the abrasion effects of ice forming particles, tapering at 19 to conform to the wing surface 16 without incrementing to any substantial degree the resistance to airflow over the wing.

Tests have shown that the maximum concentration of impinging drops occurs slightly below the stagnation point of the airfoil. For a symmetrical airfoil operating without lift this point is exactly at the leading edge of the wing. For airfoils operating with lift the stagnation point usually occurs below the leading edge. Therefore, this invention contemplates that for meteorological conditions usually encountered in flight, the heating intensity should be of the order of 8 watts per square inch for an airfoil section of 8 ft. chord length and flight speed of about 200 M. P. H. In order that unduly high surface temperatures on the balance of the heated surface do not overheat the surface and cause a possible breakdown of the insulating layer, a heat intensity of 5 or 6 watts per square inch is adequate for most icing conditions.

It has been found that the accretion of ice is greatest at points A on the leading edge of the wing (Fig. 2), the so-called stagnation point, and that areas B and C, respectively, 10 and 15 per cent of the chord length D are subject to ice accretion to a degree which impairs the aerodynamic qualities of the wing. Therefore, while it is not to be construed that this invention is limited in application to just those areas in any fixed proportion, nor used solely upon wing surfaces, it has been found that the most efficient removal of ice is obtained by the use of the de-icer in the areas named.

In Figs. 3 and 4 it will be seen that strips 17 and 17' are grouped in sections 20, 21, and 22, for example, and each section is separated from the next by sufficient distance to permit connections to the electrical system, here shown in exaggerated detail, but generally ¼ of an inch is adequate. The strips 17, 17' are connected electrically by leads 23 and 24 to the aircraft electrical system to be described later. At area A, strips 17, 17' are connected together in parallel, as an example; at areas B and C, they are connected to the leads 23 and 24 singly where they are closest to area A, and are connected in series where they are farthest from area A. It will be seen, therefore, that the heat radiating from the sections 20, 21, 22, is greatest along the stagnation point of the leading edge and is less at the edges of each section on the upper and lower surfaces of the wing.

Figure 5:
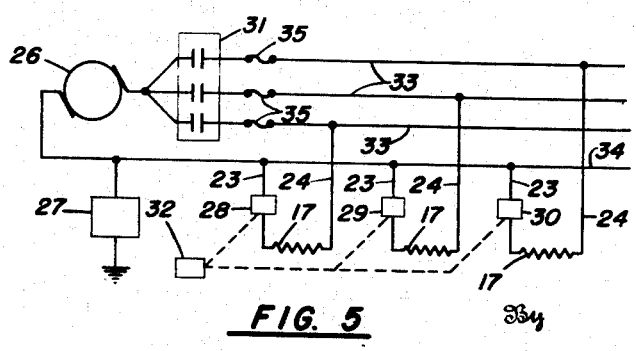
Fig. 5 is a schematic view of the electrical circuits of the invention.

In Fig. 5, the current leads 24, which in Figs. 3 and 4 are shown entering holes 25 in the wing surface 16, are each connected to one of the hot leads 33 that are in turn connected to generator 26 which supplies current to the loads 17 of the individual sections 20, 21 and 22. The return leads 23 are each connected to the common neutral lead 34 to complete the circuit between the generator and the loads. To protect the aircraft from fires caused by short-circuiting of the de-icing system a fuse 35 and a circuit breaker 31 are positioned in each of the hot leads 33 ahead of the leads 24, and a circuit breaker relay 27 is connected between the neutral lead 34 and ground at a point between the return leads 23 and the generator. The relay 27 is of a common commercial type and is operatively connected to the circuit breakers 31 to maintain them in a closed position during the normal operating sequence of the de-icer system. Whenever the system is shorted out, the relay is energized to open the circuit breakers, thus interrupting the flow of current to the loads 17. Any inadvertent grounding of any of the de-icer groups will energize the relay 27 which will in turn open the circuit via circuit breaker 31.

Timers 28, 29, and 30, are each connected in one of the return leads 23 and are interconnected with manual control 32 for adjustment of the intervals of operation. It is to be understood, of course, that while only three sections 20, 21, and 22 are shown, and a like number of timers 28, 29, and 30, the number of sections and associated timers may be varied to provide heating to areas wherever desired on the aircraft.

In operation, it has been proved by experiments that certain areas of the wing surface require de-icing oftener than others; that it is dangerous to allow ice to accumulate on those surfaces which have following tail surfaces or control devices, while at the wing tips, for instance, the removal of a greater quantity of ice at one time does not present any particular hazard. It will be seen, therefore, that the particular arrangement of the timer sequences can be varied to meet all conditions of icing and to remove the ice accumulation efficiently and without danger. Also, it is entirely likely that those sections adjacent the airplane's engines and exhaust pipes may not need as frequent de-icing or as much heat radiation.

The timers 28, 29, and 30 may be adjusted to operate spanwise, in sequence, and in unison with a corresponding section on the other wing in order that the wings of the airplane have identical lifting characteristics at all times.

Obviously many modifications and variations of the present invention are possible in the light of the above teachings. It is therefore to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed is:

1. In an airfoil having a leading edge with a stagnation area of high rate of ice accretion relative to the remainder of the airfoil, a de-icer system comprising a source of electrical power, a plurality of circuit breakers connected to said source, a circuit breaker relay grounded to the airfoil and connected to said source, a conductor connected to each circuit breaker, resistance strips connected to the leading edge of said airfoil and to said conductors, the strips at said stagnation area being connected in parallel and the adjacent strips being connected in series and also singly, and timers to control the duration of operativeness of said strips connected to said conductors between said relay and said resistance strips.

2. The system of claim 1 and; said airfoil having spaced apertures in it through which said conductors are passed.

References Cited in the file of this patent

UNITED STATES PATENTS

| Number | Name | Date |
| --- | --- | --- |
| 2,359,787 | Peters et al. | Oct. 10, 1944 |
| 2,393,635 | Hubbard | Jan. 29, 1946 |
| 2,487,658 | La Rue | Nov. 8, 1949 |
| 2,496,279 | Ely et al. | Feb. 7, 1950 |
| 2,590,944 | Cowdrey et al. | Apr. 1, 1952 |

FOREIGN PATENTS

| Number | Country | Date |
| --- | --- | --- |
| 935,233 | France | Feb. 2, 1948 |